United States Patent
Nguyen et al.

(10) Patent No.: US 7,963,330 B2
(45) Date of Patent: *Jun. 21, 2011

(54) RESIN COMPOSITIONS AND METHODS OF USING RESIN COMPOSITIONS TO CONTROL PROPPANT FLOW-BACK

(75) Inventors: Philip D. Nguyen, Duncan, OK (US); Johnny A. Barton, Edmond, OK (US); O. Marlene Isenberg, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/643,460

(22) Filed: Dec. 21, 2009

(65) Prior Publication Data

US 2010/0132943 A1    Jun. 3, 2010

Related U.S. Application Data

(60) Continuation-in-part of application No. 11/833,649, filed on Aug. 3, 2007, now abandoned, which is a division of application No. 10/775,347, filed on Feb. 10, 2004, now abandoned.

(51) Int. Cl.
*E21B 43/267* (2006.01)
*E21B 33/13* (2006.01)
(52) U.S. Cl. .................. 166/280.1; 166/295; 166/305.1
(58) Field of Classification Search .................. None
See application file for complete search history.

(56) References Cited

U.S. PATENT DOCUMENTS

| | | |
|---|---|---|
| 2,238,671 A | 4/1941 | Woodhouse |
| 2,703,316 A | 3/1955 | Schneider |
| 2,869,642 A | 1/1959 | McKay et al. |
| 3,047,067 A | 7/1962 | Williams et al. |
| 3,052,298 A | 9/1962 | Malott |
| 3,070,165 A | 12/1962 | Stratton |
| 3,123,138 A | 3/1964 | Robichaux |
| 3,173,484 A | 3/1965 | Huitt et al. |
| 3,176,768 A | 4/1965 | Brandt et al. |
| 3,195,635 A | 7/1965 | Fast |
| 3,199,590 A | 8/1965 | Young |
| 3,272,650 A | 9/1966 | MacVittie |
| 3,297,086 A | 1/1967 | Spain |
| 3,302,719 A | 2/1967 | Fischer |
| 3,308,885 A | 3/1967 | Sandiford |
| 3,308,886 A | 3/1967 | Evans |
| 3,316,965 A | 5/1967 | Watanabe |
| 3,329,204 A | 7/1967 | Brieger |
| 3,336,980 A | 8/1967 | Rike |
| 3,364,995 A | 1/1968 | Atkins et al. |
| 3,366,178 A | 1/1968 | Malone et al. |
| 3,375,872 A | 4/1968 | McLaughlin et al. |
| 3,378,074 A | 4/1968 | Kiel |
| 3,404,735 A | 10/1968 | Young et al. |
| 3,415,320 A | 12/1968 | Young |
| 3,455,390 A | 7/1969 | Gallus |
| 3,478,824 A | 11/1969 | Hess et al. |
| 3,481,403 A | 12/1969 | Gidley et al. |
| 3,489,222 A | 1/1970 | Millhone et al. |
| 3,492,147 A | 1/1970 | Young et al. |
| 3,525,398 A | 8/1970 | Fisher |
| 3,565,176 A | 2/1971 | Clifford |
| 3,592,266 A | 7/1971 | Tinsley |
| 3,659,651 A | 5/1972 | Graham |
| 3,681,287 A | 8/1972 | Brown et al. |
| 3,708,013 A | 1/1973 | Dismukes |
| 3,709,298 A | 1/1973 | Pramann |
| 3,709,641 A | 1/1973 | Sarem |
| 3,741,308 A | 6/1973 | Veley |
| 3,754,598 A | 8/1973 | Holloway, Jr. |
| 3,765,804 A | 10/1973 | Brandon |
| 3,768,564 A | 10/1973 | Knox et al. |
| 3,769,070 A | 10/1973 | Schilt |
| 3,784,585 A | 1/1974 | Schmitt et al. |
| 3,819,525 A | 6/1974 | Hattenbrun |
| 3,828,854 A | 8/1974 | Templeton et al. |
| 3,842,911 A | 10/1974 | Knox et al. |
| 3,850,247 A | 11/1974 | Tinsley |
| 3,854,533 A | 12/1974 | Gurley et al. |
| 3,857,444 A | 12/1974 | Copeland |
| 3,861,467 A | 1/1975 | Harnsberger |
| 3,863,709 A | 2/1975 | Fitch |
| 3,868,998 A | 3/1975 | Lybarger et al. |
| 3,888,311 A | 6/1975 | Cooke, Jr. |
| 3,912,692 A | 10/1975 | Casey et al. |

(Continued)

FOREIGN PATENT DOCUMENTS

CA    2063877    9/1992

(Continued)

OTHER PUBLICATIONS

U.S. Appl. No. 12/080,647, filed Apr. 4, 2008, Dalrymple et al.

(Continued)

*Primary Examiner* — Zakiya W Bates
*Assistant Examiner* — Angela M DiTrani
(74) *Attorney, Agent, or Firm* — Robert A. Kent; McDermott Will & Emery LLP

(57) ABSTRACT

Methods and compositions that include a resin composition having from about 5% to about 30% phenol, from about 40% to about 70% phenol formaldehyde, from about 10 to about 40% furfuryl alcohol, from about 0.1% to about 3% of a silane coupling agent, and from about 1% to about 15% of a surfactant and methods of using of that resin in controlling particulate flowback from a subterranean formation.

20 Claims, No Drawings

U.S. PATENT DOCUMENTS

| | | |
|---|---|---|
| 3,933,205 A | 1/1976 | Kiel |
| 3,948,672 A | 4/1976 | Harnsberger |
| 3,955,993 A | 5/1976 | Curtice et al. |
| 3,960,736 A | 6/1976 | Free et al. |
| 4,000,781 A | 1/1977 | Knapp |
| 4,008,763 A | 2/1977 | Lowe, Jr. |
| 4,015,995 A | 4/1977 | Hess |
| 4,018,285 A | 4/1977 | Watkins et al. |
| 4,029,148 A | 6/1977 | Emery |
| 4,031,958 A | 6/1977 | Sandiford et al. |
| 4,042,032 A | 8/1977 | Anderson et al. |
| 4,060,988 A | 12/1977 | Arnold |
| 4,068,718 A | 1/1978 | Cooke, Jr. et al. |
| 4,070,865 A | 1/1978 | McLaughlin |
| 4,074,760 A | 2/1978 | Copeland et al. |
| 4,085,801 A | 4/1978 | Sifferman et al. |
| 4,085,802 A | 4/1978 | Sifferman et al. |
| 4,089,437 A | 5/1978 | Chutter et al. |
| 4,127,173 A | 11/1978 | Watkins et al. |
| 4,169,798 A | 10/1979 | DeMartino |
| 4,172,066 A | 10/1979 | Zweigle et al. |
| 4,245,702 A | 1/1981 | Haafkens et al. |
| 4,247,430 A | 1/1981 | Constien |
| 4,259,205 A | 3/1981 | Murphey |
| 4,273,187 A | 6/1981 | Satter et al. |
| 4,291,766 A | 9/1981 | Davies et al. |
| 4,305,463 A | 12/1981 | Zakiewicz |
| 4,336,842 A | 6/1982 | Graham et al. |
| 4,352,674 A | 10/1982 | Fery |
| 4,353,806 A | 10/1982 | Canter et al. |
| 4,387,769 A | 6/1983 | Erbstoesser et al. |
| 4,392,988 A | 7/1983 | Dobson et al. |
| 4,399,866 A | 8/1983 | Dearth |
| 4,415,805 A | 11/1983 | Fertl et al. |
| 4,428,427 A | 1/1984 | Friedman |
| 4,439,489 A | 3/1984 | Johnson et al. |
| 4,441,556 A | 4/1984 | Powers et al. |
| 4,443,347 A | 4/1984 | Underdown et al. |
| 4,460,052 A | 7/1984 | Gockel |
| 4,470,915 A | 9/1984 | Conway |
| 4,493,875 A | 1/1985 | Beck et al. |
| 4,494,605 A | 1/1985 | Wiechel et al. |
| 4,498,995 A | 2/1985 | Gockel et al. |
| 4,501,328 A | 2/1985 | Nichols |
| 4,527,627 A | 7/1985 | Graham et al. |
| 4,541,489 A | 9/1985 | Wu |
| 4,546,012 A | 10/1985 | Brooks |
| 4,553,596 A | 11/1985 | Graham et al. |
| 4,564,459 A | 1/1986 | Underdown et al. |
| 4,572,803 A | 2/1986 | Yamazoe et al. |
| 4,585,064 A | 4/1986 | Graham et al. |
| 4,649,998 A | 3/1987 | Friedman |
| 4,664,819 A | 5/1987 | Glaze et al. |
| 4,665,988 A | 5/1987 | Murphey et al. |
| 4,669,543 A | 6/1987 | Young |
| 4,670,501 A | 6/1987 | Dymond et al. |
| 4,675,140 A | 6/1987 | Sparks et al. |
| 4,681,165 A | 7/1987 | Bannister |
| 4,683,954 A | 8/1987 | Walker et al. |
| 4,694,905 A | 9/1987 | Armbruster |
| 4,715,967 A | 12/1987 | Bellis |
| 4,716,964 A | 1/1988 | Erbstoesser et al. |
| 4,733,729 A | 3/1988 | Copeland |
| 4,739,832 A | 4/1988 | Jennings, Jr. et al. |
| 4,772,646 A | 9/1988 | Harms et al. |
| 4,777,200 A | 10/1988 | Dymond et al. |
| 4,785,884 A | 11/1988 | Armbruster |
| 4,787,453 A | 11/1988 | Hewgill et al. |
| 4,789,105 A | 12/1988 | Hosokawa et al. |
| 4,796,701 A | 1/1989 | Hudson et al. |
| 4,797,262 A | 1/1989 | Dewitz |
| 4,800,960 A | 1/1989 | Friedman et al. |
| 4,809,783 A | 3/1989 | Hollenbeck et al. |
| 4,817,721 A | 4/1989 | Pober |
| 4,829,100 A | 5/1989 | Murphey et al. |
| 4,838,352 A | 6/1989 | Oberste-Padtberg et al. |
| 4,842,070 A | 6/1989 | Sharp |
| 4,842,072 A | 6/1989 | Friedman et al. |
| 4,846,118 A | 7/1989 | Slattery et al. |
| 4,848,467 A | 7/1989 | Cantu et al. |
| 4,848,470 A | 7/1989 | Korpics |
| 4,850,430 A | 7/1989 | Copeland et al. |
| 4,875,525 A | 10/1989 | Mana |
| 4,886,354 A | 12/1989 | Welch et al. |
| 4,888,240 A | 12/1989 | Graham et al. |
| 4,892,147 A | 1/1990 | Jennings, Jr. et al. |
| 4,895,207 A | 1/1990 | Friedman et al. |
| 4,898,750 A | 2/1990 | Friedman et al. |
| 4,903,770 A | 2/1990 | Friedman et al. |
| 4,921,576 A | 5/1990 | Hurd |
| 4,934,456 A | 6/1990 | Moradi-Araghi |
| 4,936,385 A | 6/1990 | Weaver et al. |
| 4,942,186 A | 7/1990 | Murphey et al. |
| 4,957,165 A | 9/1990 | Cantu et al. |
| 4,959,432 A | 9/1990 | Fan et al. |
| 4,961,466 A | 10/1990 | Himes et al. |
| 4,969,522 A | 11/1990 | Whitehurst et al. |
| 4,969,523 A | 11/1990 | Martin et al. |
| 4,984,635 A | 1/1991 | Cullick et al. |
| 4,986,353 A | 1/1991 | Clark et al. |
| 4,986,354 A | 1/1991 | Cantu et al. |
| 4,986,355 A | 1/1991 | Casad et al. |
| 5,030,603 A | 7/1991 | Rumpf et al. |
| 5,049,743 A | 9/1991 | Taylor, III et al. |
| 5,056,597 A | 10/1991 | Stowe, III et al. |
| 5,082,056 A | 1/1992 | Tackett, Jr. et al. |
| 5,095,987 A | 3/1992 | Weaver et al. |
| 5,105,886 A | 4/1992 | Strubhar et al. |
| 5,107,928 A | 4/1992 | Hilterhaus |
| 5,128,390 A | 7/1992 | Murphey et al. |
| 5,135,051 A | 8/1992 | Facteau et al. |
| 5,142,023 A | 8/1992 | Gruber et al. |
| 5,165,438 A | 11/1992 | Facteau et al. |
| 5,173,527 A | 12/1992 | Calve et al. |
| 5,178,218 A | 1/1993 | Dees |
| 5,182,051 A | 1/1993 | Bandy et al. |
| 5,199,491 A | 4/1993 | Kutta et al. |
| 5,199,492 A | 4/1993 | Surles et al. |
| 5,211,234 A | 5/1993 | Floyd |
| 5,216,050 A | 6/1993 | Sinclair |
| 5,218,038 A | 6/1993 | Johnson et al. |
| 5,232,955 A | 8/1993 | Csabai et al. |
| 5,232,961 A | 8/1993 | Murphey et al. |
| 5,238,068 A | 8/1993 | Fredrickson et al. |
| 5,244,362 A | 9/1993 | Conally et al. |
| 5,247,059 A | 9/1993 | Gruber et al. |
| 5,249,627 A | 10/1993 | Harms et al. |
| 5,249,628 A | 10/1993 | Surjaatmadia |
| 5,256,729 A | 10/1993 | Kutta et al. |
| 5,265,678 A | 11/1993 | Grundmann |
| 5,273,115 A | 12/1993 | Spafford |
| 5,278,203 A | 1/1994 | Harms |
| 5,285,849 A | 2/1994 | Surles et al. |
| 5,293,939 A | 3/1994 | Surles et al. |
| 5,295,542 A | 3/1994 | Cole et al. |
| 5,320,171 A | 6/1994 | Laramay |
| 5,321,062 A | 6/1994 | Landrum et al. |
| 5,325,923 A | 7/1994 | Surjaatmadja et al. |
| 5,330,005 A | 7/1994 | Card et al. |
| 5,332,037 A | 7/1994 | Schmidt et al. |
| 5,335,726 A | 8/1994 | Rodrigues |
| 5,351,754 A | 10/1994 | Hardin et al. |
| 5,358,051 A | 10/1994 | Rodrigues |
| 5,359,026 A | 10/1994 | Gruber |
| 5,360,068 A | 11/1994 | Sprunt et al. |
| 5,361,856 A | 11/1994 | Surjaatmadja et al. |
| 5,363,916 A | 11/1994 | Himes et al. |
| 5,373,901 A | 12/1994 | Norman et al. |
| 5,377,756 A | 1/1995 | Northrop et al. |
| 5,377,759 A | 1/1995 | Surles |
| 5,381,864 A | 1/1995 | Nguyen et al. |
| 5,386,874 A | 2/1995 | Laramay et al. |
| 5,388,648 A | 2/1995 | Jordan, Jr. |
| 5,390,741 A | 2/1995 | Payton et al. |
| 5,393,810 A | 2/1995 | Harris et al. |
| 5,396,957 A | 3/1995 | Surjaatmadja et al. |
| 5,402,846 A | 4/1995 | Jennings, Jr. et al. |

| | | | | | |
|---|---|---|---|---|---|
| 5,403,822 A | 4/1995 | Mueller et al. | 5,893,416 A | 4/1999 | Read |
| 5,420,174 A | 5/1995 | Dewprashad | 5,901,789 A | 5/1999 | Donnelly et al. |
| 5,422,183 A | 6/1995 | Sinclair et al. | 5,908,073 A | 6/1999 | Nguyen et al. |
| 5,423,381 A | 6/1995 | Surles et al. | 5,911,282 A | 6/1999 | Onan et al. |
| 5,439,055 A | 8/1995 | Card et al. | 5,916,933 A | 6/1999 | Johnson et al. |
| 5,460,226 A | 10/1995 | Lawton et al. | 5,921,317 A | 7/1999 | Dewprashad et al. |
| 5,464,060 A | 11/1995 | Hale et al. | 5,924,488 A | 7/1999 | Nguyen et al. |
| 5,475,080 A | 12/1995 | Gruber et al. | 5,929,437 A | 7/1999 | Elliott et al. |
| 5,484,881 A | 1/1996 | Gruber et al. | 5,944,105 A | 8/1999 | Nguyen |
| 5,492,177 A | 2/1996 | Yeh et al. | 5,944,106 A | 8/1999 | Dalrymple et al. |
| 5,492,178 A | 2/1996 | Nguyen et al. | 5,945,387 A | 8/1999 | Chatterji et al. |
| 5,494,103 A | 2/1996 | Surjaatmadja et al. | 5,948,734 A | 9/1999 | Sinclair et al. |
| 5,494,178 A | 2/1996 | Maharg | 5,957,204 A | 9/1999 | Chatterji et al. |
| 5,497,830 A | 3/1996 | Boles et al. | 5,960,784 A | 10/1999 | Ryan |
| 5,498,280 A | 3/1996 | Fistner et al. | 5,960,877 A | 10/1999 | Funkhouser et al. |
| 5,499,678 A | 3/1996 | Surjaatmadja et al. | 5,960,878 A | 10/1999 | Nguyen et al. |
| 5,501,275 A | 3/1996 | Card et al. | 5,960,880 A | 10/1999 | Nguyen et al. |
| 5,505,787 A | 4/1996 | Yamaguchi | 5,964,291 A | 10/1999 | Bourne et al. |
| 5,512,071 A | 4/1996 | Yam et al. | 5,969,006 A | 10/1999 | Onan et al. |
| 5,520,250 A | 5/1996 | Harry et al. | 5,969,823 A | 10/1999 | Wurz et al. |
| 5,522,460 A | 6/1996 | Shu | 5,977,283 A | 11/1999 | Rossitto |
| 5,529,123 A | 6/1996 | Carpenter et al. | 5,994,785 A | 11/1999 | Higuchi et al. |
| 5,531,274 A | 7/1996 | Bienvenu, Jr. | RE36,466 E | 12/1999 | Nelson et al. |
| 5,536,807 A | 7/1996 | Gruber et al. | 6,003,600 A | 12/1999 | Nguyen et al. |
| 5,545,824 A | 8/1996 | Stengel et al. | 6,004,400 A | 12/1999 | Bishop et al. |
| 5,547,023 A | 8/1996 | McDaniel et al. | 6,006,835 A | 12/1999 | Onan et al. |
| 5,551,513 A | 9/1996 | Surles et al. | 6,006,836 A | 12/1999 | Chatterji et al. |
| 5,551,514 A | 9/1996 | Nelson et al. | 6,012,524 A | 1/2000 | Chatterji et al. |
| 5,582,249 A | 12/1996 | Caveny et al. | 6,016,870 A | 1/2000 | Dewprashad et al. |
| 5,582,250 A | 12/1996 | Constien | 6,024,170 A | 2/2000 | McCabe et al. |
| 5,588,488 A | 12/1996 | Vijn et al. | 6,028,113 A | 2/2000 | Scepanski |
| 5,591,700 A | 1/1997 | Harris et al. | 6,028,534 A | 2/2000 | Ciglenec et al. |
| 5,594,095 A | 1/1997 | Gruber et al. | 6,040,398 A | 3/2000 | Kinsho et al. |
| 5,595,245 A | 1/1997 | Scott, III | 6,047,772 A | 4/2000 | Weaver et al. |
| 5,597,784 A | 1/1997 | Sinclair et al. | 6,059,034 A | 5/2000 | Rickards et al. |
| 5,604,184 A | 2/1997 | Ellis et al. | 6,059,035 A | 5/2000 | Chatterji et al. |
| 5,604,186 A | 2/1997 | Hunt et al. | 6,059,036 A | 5/2000 | Chatterji et al. |
| 5,609,207 A | 3/1997 | Dewprashad et al. | 6,063,738 A | 5/2000 | Chatterji et al. |
| 5,620,049 A | 4/1997 | Gipson et al. | 6,068,055 A | 5/2000 | Chatterji et al. |
| 5,639,806 A | 6/1997 | Johnson et al. | 6,069,117 A | 5/2000 | Onan et al. |
| 5,663,123 A | 9/1997 | Goodhue, Jr. et al. | 6,070,667 A | 6/2000 | Gano |
| 5,670,473 A | 9/1997 | Scepanski | 6,074,739 A | 6/2000 | Katagiri |
| 5,692,566 A | 12/1997 | Surles | 6,079,492 A | 6/2000 | Hoogteijling et al. |
| 5,697,440 A | 12/1997 | Weaver et al. | 6,098,711 A | 8/2000 | Chatterji et al. |
| 5,697,448 A | 12/1997 | Johnson | 6,114,410 A | 9/2000 | Betzold |
| 5,698,322 A | 12/1997 | Tsai et al. | 6,123,871 A | 9/2000 | Carroll |
| 5,701,956 A | 12/1997 | Hardy et al. | 6,123,965 A | 9/2000 | Jacon et al. |
| 5,712,314 A | 1/1998 | Surles et al. | 6,124,246 A | 9/2000 | Heathman et al. |
| 5,732,364 A | 3/1998 | Kalb et al. | 6,130,286 A | 10/2000 | Thomas et al. |
| 5,738,136 A | 4/1998 | Rosenberg | 6,131,661 A | 10/2000 | Conner et al. |
| 5,765,642 A | 6/1998 | Surjaatmadja | 6,135,987 A | 10/2000 | Tsai et al. |
| 5,775,425 A | 7/1998 | Weaver et al. | 6,140,446 A | 10/2000 | Fujiki et al. |
| 5,782,300 A | 7/1998 | James et al. | 6,143,698 A | 11/2000 | Murphey et al. |
| 5,783,822 A | 7/1998 | Buchanan et al. | 6,148,911 A | 11/2000 | Gipson et al. |
| 5,787,986 A | 8/1998 | Weaver et al. | 6,152,234 A | 11/2000 | Newhouse et al. |
| 5,791,415 A | 8/1998 | Nguyen et al. | 6,162,766 A | 12/2000 | Muir et al. |
| 5,799,734 A | 9/1998 | Norman et al. | 6,165,947 A | 12/2000 | Chang et al. |
| 5,806,593 A | 9/1998 | Surles | 6,169,058 B1 | 1/2001 | Le et al. |
| 5,830,987 A | 11/1998 | Smith | 6,172,011 B1 | 1/2001 | Card et al. |
| 5,833,000 A | 11/1998 | Weaver et al. | 6,172,077 B1 | 1/2001 | Curtis et al. |
| 5,833,361 A | 11/1998 | Funk | 6,176,315 B1 | 1/2001 | Reddy et al. |
| 5,836,391 A | 11/1998 | Jonasson et al. | 6,177,484 B1 | 1/2001 | Surles |
| 5,836,392 A | 11/1998 | Urlwin-Smith | 6,184,311 B1 | 2/2001 | O'Keeffe et al. |
| 5,836,393 A | 11/1998 | Johnson | 6,186,228 B1 | 2/2001 | Wegener et al. |
| 5,837,656 A | 11/1998 | Sinclair et al. | 6,187,834 B1 | 2/2001 | Thayer et al. |
| 5,837,785 A | 11/1998 | Kinsho et al. | 6,187,839 B1 | 2/2001 | Eoff et al. |
| 5,839,510 A | 11/1998 | Weaver et al. | 6,189,615 B1 | 2/2001 | Sydansk |
| 5,840,784 A | 11/1998 | Funkhouser et al. | 6,192,985 B1 | 2/2001 | Hinkel et al. |
| 5,849,401 A | 12/1998 | El-Afandi et al. | 6,192,986 B1 | 2/2001 | Urlwin-Smith |
| 5,849,590 A | 12/1998 | Anderson, II et al. | 6,196,317 B1 | 3/2001 | Hardy |
| 5,853,048 A | 12/1998 | Weaver et al. | 6,202,751 B1 | 3/2001 | Chatterji et al. |
| 5,864,003 A | 1/1999 | Qureshi et al. | 6,209,643 B1 | 4/2001 | Nguyen et al. |
| 5,865,936 A | 2/1999 | Edelman et al. | 6,209,644 B1 | 4/2001 | Brunet |
| 5,871,049 A | 2/1999 | Weaver et al. | 6,209,646 B1 | 4/2001 | Reddy et al. |
| 5,873,413 A | 2/1999 | Chatterji et al. | 6,210,471 B1 | 4/2001 | Craig |
| 5,875,844 A | 3/1999 | Chatterji et al. | 6,214,773 B1 | 4/2001 | Harris et al. |
| 5,875,845 A | 3/1999 | Chatterji et al. | 6,231,664 B1 | 5/2001 | Chatterji et al. |
| 5,875,846 A | 3/1999 | Chatterji et al. | 6,234,251 B1 | 5/2001 | Chatterji et al. |
| 5,893,383 A | 4/1999 | Facteau | 6,238,597 B1 | 5/2001 | Yim et al. |

| | | |
|---|---|---|
| 6,241,019 B1 | 6/2001 | Davidson et al. |
| 6,242,390 B1 | 6/2001 | Mitchell et al. |
| 6,244,344 B1 | 6/2001 | Chatterji et al. |
| 6,257,335 B1 | 7/2001 | Nguyen et al. |
| 6,260,622 B1 | 7/2001 | Blok et al. |
| 6,271,181 B1 | 8/2001 | Chatterji et al. |
| 6,274,650 B1 | 8/2001 | Cui |
| 6,279,652 B1 | 8/2001 | Chatterji et al. |
| 6,279,656 B1 | 8/2001 | Sinclair et al. |
| 6,283,214 B1 | 9/2001 | Guinot et al. |
| 6,302,207 B1 | 10/2001 | Nguyen et al. |
| 6,306,998 B1 | 10/2001 | Kimura et al. |
| 6,310,008 B1 | 10/2001 | Rietjens |
| 6,311,773 B1 | 11/2001 | Todd et al. |
| 6,315,040 B1 | 11/2001 | Donnelly |
| 6,321,841 B1 | 11/2001 | Eoff et al. |
| 6,323,307 B1 | 11/2001 | Bigg et al. |
| 6,326,458 B1 | 12/2001 | Gruber et al. |
| 6,328,105 B1 | 12/2001 | Betzold |
| 6,328,106 B1 | 12/2001 | Griffith et al. |
| 6,330,916 B1 | 12/2001 | Rickards et al. |
| 6,330,917 B2 | 12/2001 | Chatterji et al. |
| 6,342,467 B1 | 1/2002 | Chang et al. |
| 6,350,309 B2 | 2/2002 | Chatterji et al. |
| 6,357,527 B1 | 3/2002 | Norman et al. |
| 6,364,018 B1 | 4/2002 | Brannon et al. |
| 6,364,945 B1 | 4/2002 | Chatterji et al. |
| 6,367,165 B1 | 4/2002 | Huttlin |
| 6,367,549 B1 | 4/2002 | Chatterji et al. |
| 6,372,678 B1 | 4/2002 | Youngman et al. |
| 6,376,571 B1 | 4/2002 | Chawla et al. |
| 6,387,986 B1 | 5/2002 | Moradi-Araghi et al. |
| 6,390,195 B1 | 5/2002 | Nguyen et al. |
| 6,394,181 B2 | 5/2002 | Schnatzmeyer et al. |
| 6,401,817 B1 | 6/2002 | Griffith et al. |
| 6,405,796 B1 | 6/2002 | Meyer et al. |
| 6,405,797 B2 | 6/2002 | Davidson et al. |
| 6,406,789 B1 | 6/2002 | McDaniel et al. |
| 6,408,943 B1 | 6/2002 | Schultz et al. |
| 6,415,509 B1 | 7/2002 | Echols et al. |
| 6,422,183 B1 | 7/2002 | Kato |
| 6,422,314 B1 | 7/2002 | Todd et al. |
| 6,439,309 B1 | 8/2002 | Matherly et al. |
| 6,439,310 B1 | 8/2002 | Scott, III et al. |
| 6,440,255 B1 | 8/2002 | Kohlhammer et al. |
| 6,446,727 B1 | 9/2002 | Zemlak et al. |
| 6,448,206 B1 | 9/2002 | Griffith et al. |
| 6,450,260 B1 | 9/2002 | James et al. |
| 6,454,003 B1 | 9/2002 | Chang et al. |
| 6,457,518 B1 | 10/2002 | Castano-Mears et al. |
| 6,458,885 B1 | 10/2002 | Stengel et al. |
| 6,478,092 B2 | 11/2002 | Voll et al. |
| 6,485,947 B1 | 11/2002 | Rajgarhia et al. |
| 6,488,091 B1 | 12/2002 | Weaver et al. |
| 6,488,763 B2 | 12/2002 | Brothers et al. |
| 6,494,263 B2 | 12/2002 | Todd |
| 6,503,870 B2 | 1/2003 | Griffith et al. |
| 6,508,305 B1 | 1/2003 | Brannon et al. |
| 6,510,896 B2 | 1/2003 | Bode et al. |
| 6,520,255 B2 | 2/2003 | Tolman et al. |
| 6,527,051 B1 | 3/2003 | Reddy et al. |
| 6,528,157 B1 | 3/2003 | Hussain et al. |
| 6,531,427 B1 | 3/2003 | Shuchart et al. |
| 6,534,449 B1 | 3/2003 | Gilmour et al. |
| 6,536,939 B1 | 3/2003 | Blue |
| 6,538,576 B1 | 3/2003 | Schultz et al. |
| 6,543,545 B1 | 4/2003 | Chatterji et al. |
| 6,550,959 B2 | 4/2003 | Huber et al. |
| 6,552,333 B1 | 4/2003 | Storm et al. |
| 6,554,071 B1 | 4/2003 | Reddy et al. |
| 6,555,507 B2 | 4/2003 | Chatterji et al. |
| 6,569,814 B1 | 5/2003 | Brady et al. |
| 6,582,819 B2 | 6/2003 | McDaniel et al. |
| 6,588,926 B2 | 7/2003 | Huber et al. |
| 6,588,928 B2 | 7/2003 | Huber et al. |
| 6,593,402 B2 | 7/2003 | Chatterji et al. |
| 6,599,863 B1 | 7/2003 | Palmer et al. |
| 6,605,570 B2 | 8/2003 | Miller et al. |
| 6,608,162 B1 | 8/2003 | Chiu et al. |
| 6,609,578 B2 | 8/2003 | Patel et al. |
| 6,616,320 B2 | 9/2003 | Huber et al. |
| 6,620,857 B2 | 9/2003 | Valet |
| 6,626,241 B2 | 9/2003 | Nguyen |
| 6,632,527 B1 | 10/2003 | McDaniel et al. |
| 6,632,778 B1 | 10/2003 | Ayoub et al. |
| 6,632,892 B2 | 10/2003 | Rubinsztajn et al. |
| 6,642,309 B2 | 11/2003 | Komitsu et al. |
| 6,648,501 B2 | 11/2003 | Huber et al. |
| 6,659,175 B2 | 12/2003 | Malone et al. |
| 6,659,179 B2 | 12/2003 | Nguyen |
| 6,664,343 B2 | 12/2003 | Narisawa et al. |
| 6,667,279 B1 | 12/2003 | Hessert et al. |
| 6,668,926 B2 | 12/2003 | Nguyen et al. |
| 6,669,771 B2 | 12/2003 | Tokiwa et al. |
| 6,677,426 B2 | 1/2004 | Noro et al. |
| 6,681,856 B1 | 1/2004 | Chatterji et al. |
| 6,686,328 B1 | 2/2004 | Binder |
| 6,691,780 B2 | 2/2004 | Nguyen et al. |
| 6,702,094 B2 | 3/2004 | Ishikawa et al. |
| 6,705,400 B1 | 3/2004 | Nguyen et al. |
| 6,710,019 B1 | 3/2004 | Sawdon et al. |
| 6,713,170 B1 | 3/2004 | Kaneko et al. |
| 6,725,926 B2 | 4/2004 | Nguyen et al. |
| 6,725,930 B2 | 4/2004 | Boney et al. |
| 6,725,931 B2 | 4/2004 | Nguyen et al. |
| 6,729,404 B2 | 5/2004 | Nguyen et al. |
| 6,729,405 B2 | 5/2004 | DiLullo et al. |
| 6,732,800 B2 | 5/2004 | Acock et al. |
| 6,745,159 B1 | 6/2004 | Todd et al. |
| 6,749,025 B1 | 6/2004 | Brannon et al. |
| 6,753,299 B2 | 6/2004 | Lunghofer et al. |
| 6,763,888 B1 | 7/2004 | Harris et al. |
| 6,764,981 B1 | 7/2004 | Eoff et al. |
| 6,766,858 B2 | 7/2004 | Nguyen et al. |
| 6,767,868 B2 | 7/2004 | Dawson et al. |
| 6,776,235 B1 | 8/2004 | England |
| 6,776,236 B1 | 8/2004 | Nguyen |
| 6,799,686 B2 | 10/2004 | Echols et al. |
| 6,817,414 B2 | 11/2004 | Lee |
| 6,830,105 B2 | 12/2004 | Thesing |
| 6,832,650 B2 | 12/2004 | Nguyen et al. |
| 6,832,651 B2 | 12/2004 | Ravi et al. |
| 6,832,655 B2 | 12/2004 | Ravensbergen et al. |
| 6,837,309 B2 | 1/2005 | Boney et al. |
| 6,840,318 B2 | 1/2005 | Lee et al. |
| 6,851,474 B2 | 2/2005 | Nguyen |
| 6,852,173 B2 | 2/2005 | Banerjee et al. |
| 6,861,394 B2 | 3/2005 | Ballard et al. |
| 6,866,099 B2 | 3/2005 | Nguyen et al. |
| 6,877,560 B2 | 4/2005 | Nguyen et al. |
| 6,881,709 B2 | 4/2005 | Nelson et al. |
| 6,886,635 B2 | 5/2005 | Hossaini et al. |
| 6,887,834 B2 | 5/2005 | Nguyen et al. |
| 6,892,813 B2 | 5/2005 | Nguyen et al. |
| 6,933,381 B2 | 8/2005 | Mallon et al. |
| 6,938,693 B2 | 9/2005 | Boney et al. |
| 6,949,491 B2 | 9/2005 | Cooke, Jr. |
| 6,962,200 B2 | 11/2005 | Nguyen et al. |
| 6,978,836 B2 | 12/2005 | Nguyen et al. |
| 6,981,560 B2 | 1/2006 | Nguyen et al. |
| 6,997,259 B2 | 2/2006 | Nguyen |
| 7,007,752 B2 | 3/2006 | Reddy et al. |
| 7,013,976 B2 | 3/2006 | Nguyen et al. |
| 7,017,665 B2 | 3/2006 | Nguyen |
| 7,021,379 B2 | 4/2006 | Nguyen et al. |
| 7,025,134 B2 | 4/2006 | Byrd et al. |
| 7,028,774 B2 | 4/2006 | Nguyen et al. |
| 7,032,663 B2 | 4/2006 | Nguyen |
| 7,032,667 B2 | 4/2006 | Nguyen et al. |
| 7,036,589 B2 | 5/2006 | Nguyen |
| 7,040,403 B2 | 5/2006 | Nguyen et al. |
| 7,044,220 B2 | 5/2006 | Nguyen et al. |
| 7,044,224 B2 | 5/2006 | Nguyen |
| 7,049,272 B2 | 5/2006 | Sinclair et al. |
| 7,056,868 B2 | 6/2006 | Benton et al. |
| 7,059,406 B2 | 6/2006 | Nguyen |
| 7,059,407 B2 | 6/2006 | Tolman et al. |
| 7,063,150 B2 | 6/2006 | Slabaugh et al. |

| | | | | | | |
|---|---|---|---|---|---|---|
| 7,063,151 B2 | 6/2006 | Nguyen et al. | | 2003/0130133 A1 | 7/2003 | Vollmer |
| 7,066,258 B2 | 6/2006 | Justus et al. | | 2003/0131999 A1 | 7/2003 | Nguyen et al. |
| 7,073,581 B2 | 7/2006 | Nguyen et al. | | 2003/0148893 A1 | 8/2003 | Lungofer et al. |
| 7,080,688 B2 | 7/2006 | Todd et al. | | 2003/0186820 A1 | 10/2003 | Thesing |
| 7,081,439 B2 | 7/2006 | Sullivan et al. | | 2003/0188766 A1 | 10/2003 | Banerjee et al. |
| 7,089,167 B2 | 8/2006 | Poe | | 2003/0188872 A1 | 10/2003 | Nguyen et al. |
| 7,091,159 B2 | 8/2006 | Eoff et al. | | 2003/0196805 A1 | 10/2003 | Boney et al. |
| 7,093,658 B2 | 8/2006 | Chatterji et al. | | 2003/0205376 A1 | 11/2003 | Ayoub et al. |
| 7,104,325 B2 | 9/2006 | Nguyen et al. | | 2003/0230408 A1 | 12/2003 | Acock et al. |
| 7,114,560 B2 | 10/2006 | Nguyen et al. | | 2003/0230431 A1 | 12/2003 | Reddy et al. |
| 7,114,570 B2 | 10/2006 | Nguyen et al. | | 2003/0234103 A1 | 12/2003 | Lee et al. |
| 7,117,942 B2 | 10/2006 | Dalrymple et al. | | 2004/0000402 A1 | 1/2004 | Nguyen et al. |
| 7,131,491 B2 | 11/2006 | Blauch et al. | | 2004/0014607 A1 | 1/2004 | Sinclair et al. |
| 7,131,493 B2 | 11/2006 | Eoff et al. | | 2004/0014608 A1 | 1/2004 | Nguyen et al. |
| 7,153,575 B2 | 12/2006 | Anderson et al. | | 2004/0040706 A1 | 3/2004 | Hossaini et al. |
| 7,156,194 B2 | 1/2007 | Nguyen | | 2004/0040708 A1 | 3/2004 | Stephenson et al. |
| 7,178,596 B2 | 2/2007 | Blauch et al. | | 2004/0040712 A1 | 3/2004 | Ravi et al. |
| 7,182,136 B2 | 2/2007 | Dalrymple et al. | | 2004/0040713 A1 | 3/2004 | Nguyen et al. |
| 7,196,040 B2 | 3/2007 | Heath et al. | | 2004/0043906 A1 | 3/2004 | Heath et al. |
| 7,198,681 B2 | 4/2007 | Nguyen et al. | | 2004/0045712 A1 | 3/2004 | Eoff et al. |
| 7,204,311 B2 | 4/2007 | Welton et al. | | 2004/0048752 A1 | 3/2004 | Nguyen et al. |
| 7,205,264 B2 | 4/2007 | Boles | | 2004/0055747 A1 | 3/2004 | Lee |
| 7,210,528 B1 | 5/2007 | Brannon et al. | | 2004/0060702 A1 | 4/2004 | Kotlar et al. |
| 7,211,547 B2 | 5/2007 | Nguyen | | 2004/0106525 A1 | 6/2004 | Wilbert et al. |
| 7,216,711 B2 | 5/2007 | Nguyen et al. | | 2004/0129923 A1 | 7/2004 | Nguyen et al. |
| 7,228,904 B2 | 6/2007 | Todd et al. | | 2004/0138068 A1 | 7/2004 | Rimmer et al. |
| 7,237,609 B2 | 7/2007 | Nguyen | | 2004/0149441 A1 | 8/2004 | Nguyen et al. |
| 7,244,693 B2 | 7/2007 | Kotlar et al. | | 2004/0152601 A1 | 8/2004 | Still et al. |
| 7,252,146 B2 | 8/2007 | Slabaugh et al. | | 2004/0152602 A1 | 8/2004 | Boles |
| 7,255,169 B2 | 8/2007 | van Batenburg et al. | | 2004/0162224 A1 | 8/2004 | Nguyen et al. |
| 7,261,156 B2 | 8/2007 | Nguyen et al. | | 2004/0177961 A1 | 9/2004 | Nguyen et al. |
| 7,264,051 B2 | 9/2007 | Nguyen et al. | | 2004/0194960 A1 | 10/2004 | Nguyen et al. |
| 7,264,052 B2 | 9/2007 | Nguyen et al. | | 2004/0194961 A1 | 10/2004 | Nguyen et al. |
| 7,265,079 B2 | 9/2007 | Wilbert et al. | | 2004/0206499 A1 | 10/2004 | Nguyen et al. |
| 7,267,171 B2 | 9/2007 | Dusterhoft et al. | | 2004/0211559 A1 | 10/2004 | Nguyen et al. |
| 7,267,717 B2 | 9/2007 | Watanabe et al. | | 2004/0211561 A1 | 10/2004 | Nguyen et al. |
| 7,273,099 B2 | 9/2007 | East, Jr. et al. | | 2004/0221992 A1 | 11/2004 | Nguyen et al. |
| 7,281,580 B2 | 10/2007 | Parker et al. | | 2004/0231845 A1 | 11/2004 | Cooke, Jr. |
| 7,281,581 B2 | 10/2007 | Nguyen et al. | | 2004/0231847 A1 | 11/2004 | Nguyen et al. |
| 7,299,875 B2 | 11/2007 | Nguyen et al. | | 2004/0256097 A1 | 12/2004 | Byrd et al. |
| 7,306,037 B2 | 12/2007 | Nguyen et al. | | 2004/0256099 A1 | 12/2004 | Nguyen et al. |
| 7,318,473 B2 | 1/2008 | East et al. | | 2004/0261993 A1 | 12/2004 | Nguyen |
| 7,318,474 B2 | 1/2008 | Welton et al. | | 2004/0261997 A1 | 12/2004 | Nguyen et al. |
| 7,325,608 B2 | 2/2008 | van Batenburg et al. | | 2004/0261999 A1 | 12/2004 | Nguyen |
| 7,334,635 B2 | 2/2008 | Nguyen | | 2005/0000694 A1 | 1/2005 | Dalrymple et al. |
| 7,334,636 B2 | 2/2008 | Nguyen | | 2005/0000731 A1 | 1/2005 | Nguyen et al. |
| 7,343,973 B2 | 3/2008 | Dusterhoft et al. | | 2005/0006093 A1 | 1/2005 | Nguyen et al. |
| 7,345,011 B2 | 3/2008 | Nguyen et al. | | 2005/0006095 A1 | 1/2005 | Justus et al. |
| 7,350,571 B2 | 4/2008 | Nguyen et al. | | 2005/0006096 A1 | 1/2005 | Nguyen et al. |
| 7,350,579 B2 | 4/2008 | Gatlin et al. | | 2005/0028976 A1 | 2/2005 | Nguyen |
| 7,353,865 B2 | 4/2008 | Nguyen et al. | | 2005/0028979 A1 | 2/2005 | Brannon et al. |
| 7,363,978 B2 | 4/2008 | Welton et al. | | 2005/0034862 A1 | 2/2005 | Nguyen |
| 7,392,847 B2 | 7/2008 | Gatlin et al. | | 2005/0034865 A1 | 2/2005 | Todd et al. |
| 7,398,825 B2 | 7/2008 | Nguyen et al. | | 2005/0045326 A1 | 3/2005 | Nguyen |
| 7,407,010 B2 | 8/2008 | Rickman et al. | | 2005/0045330 A1 | 3/2005 | Nguyen et al. |
| 7,413,010 B2 | 8/2008 | Blauch et al. | | 2005/0045384 A1 | 3/2005 | Nguyen et al. |
| 7,419,937 B2 | 9/2008 | Rimmer et al. | | 2005/0051331 A1 | 3/2005 | Nguyen et al. |
| 7,426,961 B2 | 9/2008 | Stephenson et al. | | 2005/0051332 A1 | 3/2005 | Nguyen et al. |
| 7,428,037 B2 | 9/2008 | Laufer et al. | | 2005/0059555 A1 | 3/2005 | Dusterhoft et al. |
| 7,448,451 B2 | 11/2008 | Nguyen et al. | | 2005/0061509 A1 | 3/2005 | Nguyen et al. |
| 7,493,957 B2 | 2/2009 | Nguyen et al. | | 2005/0089631 A1 | 4/2005 | Nguyen et al. |
| 7,500,519 B2 | 3/2009 | Weaver et al. | | 2005/0092489 A1 | 5/2005 | Welton et al. |
| 7,500,521 B2 | 3/2009 | Nguyen et al. | | 2005/0126780 A1 | 6/2005 | Todd et al. |
| 7,541,318 B2 | 6/2009 | Weaver et al. | | 2005/0139359 A1 | 6/2005 | Maurer et al. |
| 2001/0016562 A1 | 8/2001 | Muir et al. | | 2005/0145385 A1 | 7/2005 | Nguyen |
| 2002/0036088 A1 | 3/2002 | Todd | | 2005/0173116 A1 | 8/2005 | Nguyen et al. |
| 2002/0043370 A1 | 4/2002 | Poe | | 2005/0178551 A1 | 8/2005 | Tolman et al. |
| 2002/0048676 A1 | 4/2002 | McDaniel et al. | | 2005/0194135 A1 | 9/2005 | Nguyen et al. |
| 2002/0070020 A1 | 6/2002 | Nguyen | | 2005/0194136 A1 | 9/2005 | Nguyen et al. |
| 2002/0104217 A1 | 8/2002 | Echols et al. | | 2005/0194140 A1 | 9/2005 | Dalrymple et al. |
| 2002/0160920 A1 | 10/2002 | Dawson et al. | | 2005/0194142 A1 | 9/2005 | Nguyen |
| 2002/0169085 A1 | 11/2002 | Miller et al. | | 2005/0197258 A1 | 9/2005 | Nguyen et al. |
| 2002/0189808 A1 | 12/2002 | Nguyen et al. | | 2005/0207001 A1 | 9/2005 | Laufer et al. |
| 2003/0006036 A1 | 1/2003 | Malone et al. | | 2005/0230111 A1 | 10/2005 | Nguyen et al. |
| 2003/0013871 A1 | 1/2003 | Mallon et al. | | 2005/0257929 A1 | 11/2005 | Nguyen et al. |
| 2003/0060374 A1 | 3/2003 | Cooke, Jr. | | 2005/0263283 A1 | 12/2005 | Nguyen |
| 2003/0106690 A1 | 6/2003 | Boney et al. | | 2005/0267001 A1 | 12/2005 | Weaver et al. |
| 2003/0114314 A1 | 6/2003 | Ballard et al. | | 2005/0269086 A1 | 12/2005 | Nguyen et al. |
| 2003/0114317 A1 | 6/2003 | Benton et al. | | 2005/0269101 A1 | 12/2005 | Stegent et al. |

| | | |
|---|---|---|
| 2005/0274510 A1 | 12/2005 | Nguyen et al. |
| 2005/0274517 A1 | 12/2005 | Blauch et al. |
| 2005/0274520 A1 | 12/2005 | Nguyen et al. |
| 2005/0277554 A1 | 12/2005 | Blauch et al. |
| 2005/0282973 A1 | 12/2005 | Nguyen et al. |
| 2005/0284632 A1 | 12/2005 | Dalrymple et al. |
| 2005/0284637 A1 | 12/2005 | Stegent et al. |
| 2006/0048943 A1 | 3/2006 | Nguyen et al. |
| 2006/0048944 A1 | 3/2006 | Van Batenburg et al. |
| 2006/0052251 A1 | 3/2006 | Anderson et al. |
| 2006/0076138 A1 | 4/2006 | Dusterhoft et al. |
| 2006/0089266 A1 | 4/2006 | Dusterhoft et al. |
| 2006/0113078 A1 | 6/2006 | Nguyen et al. |
| 2006/0124303 A1 | 6/2006 | Nguyen et al. |
| 2006/0124309 A1 | 6/2006 | Nguyen et al. |
| 2006/0137875 A1 | 6/2006 | Dusterhoft et al. |
| 2006/0157243 A1 | 7/2006 | Nguyen et al. |
| 2006/0175058 A1 | 8/2006 | Nguyen et al. |
| 2006/0219405 A1 | 10/2006 | Nguyen et al. |
| 2006/0219408 A1 | 10/2006 | Nguyen et al. |
| 2006/0234874 A1 | 10/2006 | Eoff et al. |
| 2006/0240994 A1 | 10/2006 | Eoff et al. |
| 2006/0240995 A1 | 10/2006 | Rickman et al. |
| 2006/0260810 A1 | 11/2006 | Weaver et al. |
| 2006/0260813 A1 | 11/2006 | Welton et al. |
| 2006/0264332 A1 | 11/2006 | Welton et al. |
| 2006/0266522 A1 | 11/2006 | Eoff et al. |
| 2006/0283592 A1 | 12/2006 | Sierra et al. |
| 2006/0289160 A1 | 12/2006 | van Batenburg et al. |
| 2007/0007009 A1 | 1/2007 | Nguyen |
| 2007/0007010 A1 | 1/2007 | Welton et al. |
| 2007/0012445 A1 | 1/2007 | Nguyen et al. |
| 2007/0017706 A1 | 1/2007 | Nguyen |
| 2007/0029087 A1 | 2/2007 | Nguyen et al. |
| 2007/0102156 A1 | 5/2007 | Nguyen et al. |
| 2007/0114032 A1 | 5/2007 | Stegent et al. |
| 2007/0131422 A1 | 6/2007 | Gatlin et al. |
| 2007/0131425 A1 | 6/2007 | Gatlin et al. |
| 2007/0179065 A1 | 8/2007 | Nguyen |
| 2007/0187090 A1 | 8/2007 | Nguyen et al. |
| 2007/0187097 A1 | 8/2007 | Weaver et al. |
| 2007/0261854 A1 | 11/2007 | Nguyen et al. |
| 2007/0267194 A1 | 11/2007 | Nguyen et al. |
| 2007/0289781 A1 | 12/2007 | Rickman et al. |
| 2008/0006405 A1 | 1/2008 | Rickman et al. |
| 2008/0006406 A1 | 1/2008 | Nguyen et al. |
| 2008/0011478 A1 | 1/2008 | Welton et al. |
| 2008/0060809 A1 | 3/2008 | Parker et al. |
| 2008/0110624 A1 | 5/2008 | Nguyen et al. |
| 2008/0115692 A1 | 5/2008 | Welton et al. |
| 2008/0135251 A1 | 6/2008 | Nguyen et al. |

FOREIGN PATENT DOCUMENTS

| | | |
|---|---|---|
| EP | 0313243 | 4/1989 |
| EP | 0506934 | 10/1992 |
| EP | 0510762 B1 | 11/1992 |
| EP | 0528595 | 2/1993 |
| EP | 0643196 | 3/1995 |
| EP | 0834644 | 4/1998 |
| EP | 0853186 | 7/1998 |
| EP | 0864726 | 9/1998 |
| EP | 0879935 B1 | 11/1998 |
| EP | 0933498 | 8/1999 |
| EP | 1001133 | 5/2000 |
| EP | 1132569 | 9/2001 |
| EP | 1326003 | 7/2003 |
| EP | 1362978 | 11/2003 |
| EP | 1394355 | 3/2004 |
| EP | 1396606 | 3/2004 |
| EP | 1398460 | 3/2004 |
| EP | 1403466 | 3/2004 |
| EP | 1464789 | 10/2004 |
| EP | 1607572 | 12/2005 |
| GB | 1107584 | 3/1968 |
| GB | 1264180 | 2/1972 |
| GB | 1292718 | 10/1972 |
| GB | 2298440 | 9/1996 |
| GB | 2382143 | 5/2003 |
| WO | WO 93/15127 | 8/1993 |
| WO | WO 94/07949 | 4/1994 |
| WO | WO 94/08078 | 4/1994 |
| WO | WO 94/08090 | 4/1994 |
| WO | WO 95/09879 | 4/1995 |
| WO | WO 97/11845 | 4/1997 |
| WO | WO 99/27229 | 6/1999 |
| WO | WO 01/87797 A1 | 11/2001 |
| WO | WO0181914 | 11/2001 |
| WO | WO 02/12674 A1 | 2/2002 |
| WO | WO 03/027431 A3 | 4/2003 |
| WO | WO2004/009956 | 1/2004 |
| WO | WO 2004/009956 | 1/2004 |
| WO | WO 2004/037946 A1 | 5/2004 |
| WO | WO 2004/038176 A1 | 5/2004 |
| WO | WO 2004/083600 | 9/2004 |
| WO | WO2004090281 | 10/2004 |
| WO | WO2004104368 | 12/2004 |
| WO | WO 2005/021928 | 3/2005 |
| WO | WO2005080749 | 9/2005 |
| WO | WO2006103385 | 10/2006 |
| WO | WO2006116868 | 11/2006 |
| WO | WO2007091007 | 8/2007 |

OTHER PUBLICATIONS

"Santrol Bioballs"; http://www.fairmounminerals.com/.sub.—SANTROL/SANTROL%20Web%20Site/B.sub- .—TD.htm. cited by other, Sep. 30, 2004.

CDX Gas, "What is Coalbed Methane?" CDX, LLC. Available @ www.cdxgas.com/what.html, printed p. 1, undated. cited by other, Feb. 16, 2005.

CDX Gas, CDX Solution, 2003, CDX, LLC, Available @ www.cdxgas.com/solution.html, printed pp. 1-2, Feb. 16, 2005.

Dusseault et ai, "Pressure Pulse Workovers in Heavy Oil", SPE 79033, 2002.

Feisenthal et al., Pressure Pulsing—An Improved Method of Waterflooding Fractured Reservoirs SPE 1788, 1957, 1967.

Foreign communication from a related counterpart application, Sep. 16, 2004.

Foreign communication related to a counterpart application, Jul. 31, 2006.

Foreign Search Report and Written Opinion (PCT/GB2005/004009), Nov. 1, 2006.

Foreign Search Report (CPW 21582 EP), Mar. 11, 2005.

Foreign Search Report and Opinion (PCT Appl. No. GB2004/001497), Jul. 20, 2004.

Foreign Search Report and Opinion (PCT Appl. No. GB2004/001842), Dec. 10, 2004.

Foreign Search Report and Opinion (PCT Appl. No. GB2004/002674), Dec. 16, 2004.

Foreign Search Report and Opinion (PCT Appl. No. GB2004/002968), Nov. 16, 2004.

Foreign Search Report and Opinion (PCT Appl. No. GB2004/004242), Feb. 10, 2005.

Foreign Search Report and Opinion (PCT Appl. No. GB2004-000689), Jun. 4, 2004.

Foreign Search Report and Opinion (PCT/GB2004/002727), Mar. 11, 2005.

Foreign Search Report and Opinion (PCT/GB2004/002747), Mar. 11, 2005.

Foreign Search Report and Opinion(PCT/GB2005/004010), Feb. 21, 2005.

Foreign Search Report and Opinion (PCT/GB2006/004102), Feb. 20, 2005.

Foreign Search Report and Opinion (PCT/GB2006/004137), Jan. 17, 2007.

Foreign Search Report and Opinion (PCT/GB2006/004852), Mar. 7, 2007.

Foreign Search Report and Opinion (PCT/GB2007/000467), Jun. 5, 2007.

Foreign Search Report and Written Opinion (PCT/GB2006/000366), Jun. 22, 2006.

Foreign Search Report (PCT/GB2005/003747), Dec. 12, 2005.

Foreign Search Report (PCT/GB2007/000421), May 10, 2007.

Gidley et al., "Recent Advances in Hydraulic Fracturing," Chapter 6, pp. 109-130, 1989.
Gorman, Plastic Electric: Lining up the Future of Conducting Polymers Science News, vol. 163, May 17, 2003.
Halliburton brochure entitled "H₂Zero Service: Introducing The Next Generation of Cost-Effective Conformance Control Solutions", 2002. cited by other, 2002.
Halliburton brochure entitled "CobraFrac Service, Coiled Tubing Fracturing—Cost-Effective Method for Stimulation Untapped Reserves", 2000.
Halliburton brochure entitled "CobraJetFrac Service, Cost-Effective Technology That Can Help Reduce Cost Per BOE Produced, Shorten Cycle time and Reduce Capex", Apr. 2003.
Halliburton brochure entitled "SurgiFrac Service, a Quick and Cost-Effective Method to Help Boost Production From Openhole Horizontal Completions", 2005.
Halliburton brochure entitled "Sanfix A Resin", 1999.
Halliburton brochure entitled "INJECTROL A Component", 1999.
Halliburton brochure entitled "INJECTROL U Sealant", 1999.
Halliburton brochure entitled "INJECTROL G Sealant" 1999.
Halliburton brochure entitled "INJECTROL IT Sealant" 1999.
Halliburton brochure entitled "INJECTROL Service Treatment" 1999.
Halliburton brochure entitled "Pillar Frac Stimulation Technique" Fracturing Service Technical Data Sheet, Jun. 1977.
Halliburton Cobra Frac Advertisement, 2001.
Halliburton Technical Flier—Multi Stage Frac Completion Methods, May 2000.
Halliburton brochure entitled "CoalStim Service, Helps Boost Cash Flow From CBM Assets", Oct. 2003.
Halliburton brochure entitled "Conductivity Endurance Technology For High Permeability Reservoirs, Helps Prevent Intrusion of Formation Material Into the Proppant Pack for Improved Long-term Production", 2003.
Halliburton brochure entitled "Expedite Service, A Step-Change Improvement Over Conventional Proppant Flowback Control Systems. Provides Up to Three Times the Conductivity of RCPs" May 2004.
Halliburton brochure entitled "SandWedge NT Conductivity Enhancement System, Enhances Proppant Pack Conductivity and Helps Prevent Intrusion of Formation Material for Improved Long-Term Production", Stimulation, HO2289 May 2004, Halliburton Communications.
International Search Report (PCT/GB2007/002273), Sep. 3, 2007.
International Search Report (PCT/GB2004/002948), May 24, 2005.
International Search Report (PCT/GB2005/000637), Jun. 2, 2005.
International Search Report (PCT/GB2005/000634), Jun. 8, 2005.
Kazakov et al., "Optimizing and Managing Coiled Tubing Frac Strings" SPE 60747, 2000.
Nguyen et al., "A Novel Approach for Enhancing Proppant Consolidation: Laboratory Testing and Field Applications", SPE 77748, 2002.
Nguyen et al., "New Guidelines for Applying Curable Resin-Coated Proppants", SPE 39582, 1997.
Owens et al., "Waterflood Pressure Pulsing for Fractured Reservoirs", SPE 1123, 1966.
Peng et al., "Pressure Pulsing Waterflooding in Dual Porosity Naturally Fractured Reservoirs", SPE 17587, 1988.
Raza, "Water and Gas Cyclic Pulsing Method for Improved Oil Recovery", SPE 3005, 1971.
S W. Almond et al., "Factors Affecting Proppant Flowback With Resin Coated Proppants," SPE 30096 (1995 European Formation Damage Conference, May 15-16, 1995).
SPE 15547, "Field Application of Lignosulfonate Gels to Reduce Channeling", South Swan Hills Miscible Unit, Alberta, Canada, by O. R. Wagner et al., 1986.
SPE 17154 Paccaloni et al., "Key Factors for Enhanced Results of Matrix Stimulation"(1988 SPE Formation Damage Control Symposium, Feb. 8-9, 1988).
SPE 20623 Paccaloni et al., Advances in Matrix Stimulation Technology, Mar. 1993.
SPE 82215, "Controlling Proppant Flowback in High-Temperature, High-Production Wells", Nguyen et al., 2003.
SPE 90398, "Maximizing Effective Proppant Permeability under High-Stress, High Gas-Rate Conditions", Dusterhoft, R., Nguyen, P., Conway, M., Sep. 2004.
Yang et al., "Experimental Study on Fracture Initiation By Pressure Pulses", SPE 63035, 2000.
Cantu et al., "Laboratory and Field Evaluation of a Combined Fluid-Loss Control Additive and Gel Breaker for Fracturing Fluids," SPE 18211, Aug. 1990.
Chelating Agents, Encyclopedia of Chemical Technology, vol. 5 (764-795), Jan. 1993.
Love et al., "Selectively Placing Many Fractures in Openhole Horizontal Wells Improves Production", SPE 50422, Nov. 1, 1998.
Yin et al., "Preparation and Characterization of Substituted Polyactides", American Chemical Society, vol. 32, No. 23, pp. 7711-7718, Nov. 16, 1999.
Advances in Polymer Science, vol. 157, "Degradable Aliphatic Polyesters" edited by A.-C. Alberston, 2001.
Yin et al., "Synthesis and Properties of Polymers Derived from Substituted Lactic Acids", American Chemical Society, Ch. 12, pp. 147-159, 2001.
Simmons et al., "Poly(phenyllactide): Synthesis, Characterization, and Hydrolytic Degradation", Biomacromolecules, 2001, vol. 2, No. 2, pp. 658-663, Jul. 24, 2001.
McDaniel et al., "Evolving New Stimulation Process Proves Highly Effective in Level 1 Dual-Lateral Completion", SPE 78697, Oct. 23, 2002.
Vichaibun et al., "A New Assay for the Enzymatic Degradation of Polylactic Acid", Short Report, ScienceAsia, vol. 29, pp. 297-300, 2003.
Funkhouser et al., "Synthetic Polymer Fracturing Fluid For High-Temperature Applications", SPE 80236, Feb. 5, 2003.
Dechy-Cabaret et al., "Controlled Ring-Opening Polymerization of Lactide and Glycolide" American Chemical Society, Chemical Reviews, A-Z, AA-AD, Apr. 28, 2004.
Foreign Search Report and Opinion (PCT/GB2004/002727), Mar. 11, 2005.
Foreign Search Report and Opinion (PCT/GB2004/005371), Feb. 5, 2006.
Office Action from U.S. Appl. No. 10/775,347, Jun. 12, 2006.
Notice of Non-Compliant Amendment from U.S. Appl. No. 10/775,347, Sep. 28, 2006.
Office Action from U.S. Appl. No. 10/775,347, Jan. 29, 2007.
Office Action from U.S. Appl. No. 10/775,347, Dec. 13, 2007.

RESIN COMPOSITIONS AND METHODS OF USING RESIN COMPOSITIONS TO CONTROL PROPPANT FLOW-BACK

CROSS-REFERENCE TO A RELATED INVENTION

This application is a continuation-in-part of commonly-owned U.S. patent application Ser. No. 11/833,649, filed Aug. 3, 2007, now abandoned, entitled "Resin Compositions and Methods of Using Resin Compositions to Control Proppant Flow-Back," which was a divisional of commonly-owned U.S. patent application Ser. No. 10/775,347, filed Feb. 10, 2004, now abandoned, entitled "Resin Compositions and Methods of Using Resin Compositions to Control Proppant Flow-Back," both of which are incorporated by reference herein for all purposes.

BACKGROUND

The present invention relates to enhancing the conductivity of subterranean formations while controlling proppant flow-back. More particularly, the present invention relates to improved resin compositions and resin-coated proppants and their use in controlling proppant flowback Hydrocarbon-producing wells are often stimulated by hydraulic fracturing treatments. In hydraulic fracturing treatments, a viscous fracturing fluid, which also functions as a carrier fluid, is pumped into a producing zone to be fractured at a rate and pressure such that one or more fractures are formed in the zone. Particulate solids for propping the fractures, commonly referred to in the art as "proppant," are generally suspended in at least a portion of the fracturing fluid so that the particulate solids are deposited in the fractures when the fracturing fluid reverts to a thin fluid to be returned to the surface. The proppant deposited in the fractures functions to prevents the fractures from fully closing and maintains conductive channels through which produced hydrocarbons can flow.

In order to prevent the subsequent flowback of proppant and other unconsolidated particulates with the produced fluids a portion of the proppant introduced into the fractures may be coated with a hardenable resin composition. When the fracturing fluid, which is the carrier fluid for the proppant, reverts to a thin fluid the resin-coated proppant is deposited in the fracture, and the fracture closes on the proppant. Such partially closed fractures apply pressure on the resin-coated proppant particles, causing the particles to be forced into contact with each other while the resin composition hardens. The hardening of the resin composition under pressure brings about the consolidation of the resin-coated proppant particles into a hard permeable mass having compressive and tensile strength that hopefully prevents unconsolidated proppant and formation sand from flowing out of the fractures with produced fluids. Flowback of the proppant or formation fines with formation fluids is undesirable as it may erode metal equipment, plug piping and vessels, and cause damage to valves, instruments, and other production equipment.

Using heretofore known hardenable resin compositions has been disadvantageous because they have short shelf lives. That is, the shelf lives of the hardenable resin components, once mixed, have heretofore been as short as about four hours or less. It has been a common practice to utilize proppant that is pre-coated with a resin composition. However, such pre-coated resins generally begin to cure immediately after they are mixed and coated onto the proppant so that by the time the proppant is used, the resin may be more than 90% cured. When such pre-cured resin completes curing once placed in the subterranean formation, the resulting consolidated proppant pack often does not have enough strength to prevent deterioration of the proppant pack and proppant flowback.

SUMMARY

The present invention relates to enhancing the conductivity of subterranean formations while controlling proppant flow-back. More particularly, the present invention relates to improved resin compositions and resin-coated proppants and their use in controlling proppant flowback.

One embodiment of the present invention provides a resin composition comprising from about 5% to about 30% phenol, from about 40% to about 70% phenol formaldehyde, from about 10 to about 40% furfuryl alcohol, from about 0.1% to about 3% of a silane coupling agent, and from about 1% to about 15% of a surfactant.

Another embodiment of the present invention describes a method of controlling proppant flowback from a fracture in a subterranean zone comprising the steps of coating the resin as described above onto at least a portion of provided proppant particles, introducing those resin-coated proppant particles into a subterranean fracture, and allowing the resin on the resin-coated proppant to substantially cure.

Another embodiment of the present invention describes a method comprising the step of providing a resin composition, wherein the resin composition comprises from about 5% to about 30% phenol by weight of the resin composition, from about 40% to about 70% phenol formaldehyde by weight of the resin composition, from about 10% to about 40% furfuryl alcohol by weight of the resin composition, from about 0.1% to about 3% of a silane coupling agent by weight of the resin composition, and from about 1% to about 15% of a surfactant by weight of the resin composition. The method further comprises providing proppant particles. The method further comprises coating the resin composition onto at least a portion of the proppant particles to create resin-coated proppant particles, wherein the resin composition does not substantially cure during coating.

Another embodiment of the present invention describes a method comprising the step of providing a resin composition, wherein the resin composition comprises from about 5% to about 30% phenol by weight of the resin composition, from about 40% to about 70% phenol formaldehyde by weight of the resin composition, from about 10% to about 40% furfuryl alcohol by weight of the resin composition, from about 0.1% to about 3% of a silane coupling agent by weight of the resin composition, and from about 1% to about 15% of a surfactant by weight of the resin composition. The method further comprises providing proppant particles. The method further comprises coating the resin composition onto at least a portion of the proppant particles to create resin-coated proppant particles. The method further comprises introducing the resin-coated proppant particles into a subterranean zone, wherein the resin composition does not substantially cure prior to introducing the resin-coated proppant particles into the subterranean zone.

Another embodiment of the present invention describes a method comprising the step of providing a resin composition, wherein the resin composition comprises from about 5% to about 30% phenol by weight of the resin composition, from about 40% to about 70% phenol formaldehyde by weight of the resin composition, from about 10% to about 40% furfuryl alcohol by weight of the resin composition, from about 0.1% to about 3% of a silane coupling agent by weight of the resin composition, and from about 1% to about 15% of a surfactant by weight of the resin composition. The method further comprises providing an initial portion of proppant particles, a middle portion of proppant particles, and a last portion of proppant particles. The method further comprises coating the resin composition onto at least the initial portion of proppant particles and the last portion of proppant particles to create an initial portion of resin-coated proppant particles and a last portion of resin-coated proppant particles, wherein the resin composition does not substantially cure during coating. The method further comprises introducing the initial portion of resin-coated proppant particles into a fracture in a subterranean zone. The method further comprises introducing the middle portion of proppant particles into the fracture in the subterranean zone. The method further comprises introducing the last portion of resin-coated proppant particles into the fracture in the subterranean zone.

The objects, features and advantages of the present invention will be readily apparent to those skilled in the art upon a reading of the description of preferred embodiments that follows.

DESCRIPTION OF PREFERRED EMBODIMENTS

The present invention provides improved resin compositions and proppants coated with such improved resin compositions suitable for use in enhancing the conductivity of subterranean formations while controlling proppant flowback.

When the resin composition of the present invention is used to coat proppant particles in a subterranean fracturing operation, any fracturing fluid known in the art may be used, including aqueous gels, emulsions, and other suitable fracturing fluids. The aqueous gels are generally comprised of water and one or more gelling agents. The emulsions may be comprised of two or more immiscible liquids such as an aqueous gelled liquid and a liquefied, normally gaseous fluid, such as nitrogen. The preferred fracturing fluids for use in accordance with this invention are aqueous gels comprised of water, a gelling agent for gelling the water and increasing its viscosity, and optionally, a cross-linking agent for cross-linking the gel and further increasing the viscosity of the fluid. The increased viscosity of the gelled or gelled and cross-linked fracturing fluid, inter alia, reduces fluid loss and allows the fracturing fluid to transport significant quantities of suspended proppant particles. The fracturing fluids may also include one or more of a variety of well-known additives such as breakers, stabilizers, fluid loss control additives, clay stabilizers, bactericides, and the like.

The water utilized in the fracturing fluid may be fresh water, salt water (e.g., water containing one or more salts dissolved therein), brine (e.g., saturated salt water), or seawater. Generally, the water can be from any source provided that it does not contain an excess of compounds that adversely affect other components in the resin composition or the performance of the resin composition relative to the subterranean conditions to which it may be subjected.

Proppant particles utilized in accordance with the present invention are generally of a size such that formation particulates that may migrate with produced fluids are prevented from being produced from the subterranean zone. Any suitable proppant may be utilized, including graded sand, bauxite, ceramic materials, glass materials, walnut hulls, polymer beads and the like. Generally, the proppant particles have a size in the range of from about 2 to about 400 mesh, U.S. sieve series. In some embodiments of the present invention, the proppant is graded sand having a particle size in the range of from about 10 to about 70 mesh, U.S. Sieve Series. Particle size distribution ranges are generally one or more of 10-20 mesh, 20-40 mesh, 40-60 mesh or 50-70 mesh, depending on the particular size and distribution of formation particulates to be screened out by the consolidated proppant particles.

The improved resin compositions of the present invention comprise phenol, phenol formaldehyde, furfuryl alcohol, a silane coupling agent, and a surfactant. The resin compositions of the present invention may be useful in a variety of subterranean conditions but are particularly well suited for use in subterranean formations exhibiting temperatures above about 200° F. The resins of the present invention do not begin to cure until they are exposed to temperatures above about 175° F. Thus, the resins of the present invention can be prepared and then stored for long periods of time at temperatures below about 175° F. without concern that the resin compositions will become unusable over time.

Phenol is a commercially available, hydroxy benzene derivative, aromatic alcohol that exhibits weak acidic properties and contains a hydroxyl group attached to a benzene ring. The resins of the present invention comprise from about 5% to about 30% phenol by weight of the overall resin composition.

Phenol formaldehyde is a commercially available synthetic polymer made from phenol and formaldehyde monomers. The resins of the present invention comprise from about 40% to about 70% phenol formaldehyde by weight of the overall resin composition.

Furfuryl alcohol is a primary alcohol and an oligomer of furan resin that is colorless or pale yellow in appearance. In the resins of the present invention, the furfuryl alcohol polymerizes from an oligomer form into a stable furan resin polymer. The resins of the present invention comprise from about 10% to about 40% furfuryl alcohol by weight of the overall resin composition.

Silane coupling agents are chemicals that contain silicone at the center of the silane molecule that is chemically attached to a first functional group such as vinyl, amino, chloro, epoxy, mercapto, and a second functional group such as methoxy or ethoxy. Silane coupling agents act such that the first functional group may attach to an organic compound while the second functional group may attach to an inorganic material or substrate to achieve a "coupling" effect. Any silane coupling agent that is compatible with the hardening agent and facilitates the coupling of the resin to the surface of the formation sand particles is suitable for use in the present invention. Examples of preferred silane coupling agents suitable for use in the present invention include, but are not limited to, N-2-(aminoethyl)-3-aminopropyltrimethoxysilane, 3-glycidoxypropyltrimethoxysilane, n-beta-(aminoethyl)-gamma-aminopropyl trimethoxysilane, and combinations thereof. The silane coupling agent used is included in the resin in an amount capable of sufficiently bonding the resin to the particulate. In some embodiments of the present invention, the silane coupling agent used is included in the resin composition in the range of from about 0.1% to about 3% by weight of the resin composition.

Any surfactant compatible with the other components of the resin composition may be used in the present invention. Such surfactants include, but are not limited to, an ethoxylated nonyl phenol phosphate ester, mixtures of one or more cationic surfactants, and one or more non-ionic surfactants and an alkyl phosphonate surfactant. The mixtures of one or more cationic and nonionic surfactants are described in U.S. Pat. No. 6,311,733, issued to Todd et al. on Nov. 6, 2001, which is incorporated herein by reference. A $C_{12}$-$C_{22}$ alkyl phosphonate surfactant is preferred. The surfactant or surfactants utilized are included in the resin composition in an amount in the range of from about 1% to about 15% by weight of the resin composition.

Any solvent that is compatible with the hardenable resin and achieves the desired viscosity effect is suitable for use in the present invention. Preferred solvents are those having high flash points (most preferably about 125° F.). As described above, use of a solvent in the hardenable resin composition is optional but may be desirable to reduce the viscosity of the hardenable resin component for a variety of reasons including ease of handling, mixing, and transferring. It is within the ability of one skilled in the art, with the benefit of this disclosure, to determine if and how much solvent is needed to achieve a suitable viscosity. Solvents suitable for use in the present invention include, but are not limited to, 2-butoxy ethanol, butylglycidyl ether, dipropylene glycol methyl ether, dipropylene glycol dimethyl ether, dimethyl sulfoxide, dimethyl formamide, diethyleneglycol methyl ether, diethylene glycol dimethyl ether, ethyleneglycol butyl ether, diethyleneglycol butyl ether, gamma-butyrolactone, butylene carbonate, propylene carbonate, ethylene carbonate, methanol, butyl alcohol, d'limonene, fatty acid methyl esters, and combinations thereof.

The amount of resin of the present invention coated onto the proppant particles generally ranges from about 0.1% to about 10% by weight of the proppant. When it is desirable or necessary to conserve a major portion of the resin composition, the resin composition may be applied to an initial portion of the proppant particles, not applied or intermittently applied to the middle portion of the proppant particles, and applied to the last portion of the proppant particles deposited in the fractures. One of ordinary skill in the art, with the benefit of this disclosure, will recognize the appropriate combination to achieve the desired conservation goals, consolidation, and permeability goals.

In one embodiment of the methods of the present invention, a resin composition is created as described above that is then is then coated onto proppant particles to form resin-coated proppant particles that are subsequently mixed with a viscous fracturing fluid. The viscous fracturing fluid containing resin-coated proppant particles is then introduced into a subterranean zone having one or more fractures therein and the resin-coated proppant particles are placed in at least one fracture. The resin-coated proppant particles are then allowed to harden and consolidate into one or more high-strength, permeable packs that prevent proppant flowback.

To facilitate a better understanding of the present invention, the following examples of some of the preferred embodiments are given. In no way should such examples be read to limit the scope of the invention.

EXAMPLES

Example 1

A resin of the present invention was prepared by mixing 0.75 mL of phenol, 6.1 mL of phenol formaldehyde, 2.55 mL of furfuryl alcohol, 0.1 mL of silane coupling agent n-beta-(aminoethyl)-gamma-aminopropyl trimethoxysilane, and 0.5 mL of an alkyl phosphonate surfactant. A volume of 7.5 mL of the resin mixture was then coated onto 250 grams of 20/40-mesh bauxite proppant. The coated proppant was then mixed with 300 mL of a fracturing fluid using carboxymethylhydroxypropyl guar as the gelling base. That gelled fluid was cross-linked with a zirconium cross-linker. The resulting viscous fracturing fluid comprising resin-coated proppant was stirred in a heated bath for 1 hour at 175° F. before being packed in brass flow cells. No closure stress was exerted on the cells and they were allowed to cure in an oven at various temperatures and for various lengths of time. Consolidated cores were obtained from the proppant packs to determine the unconsolidated compressive strength (UCS). The results of these tests are illustrated in Table 1, below:

TABLE 1

Effect of Cure Temperature and Cure Time on Unconfined Compressive Strength (psi) of Resin-Treated Proppant

| Cure Time | Cure Temperature | | | | |
| --- | --- | --- | --- | --- | --- |
| | 225° F. | 250° F. | 275° F. | 300° F. | 325° F. |
| 2 hrs | 12 | 16 | 113 | 540 | 489 |
| 3 hrs | 101 | 96 | 392 | 654 | 580 |
| 6 hrs | 195 | 314 | 590 | 593 | 779 |
| 24 hrs | — | — | — | — | 765 |
| 96 hrs | — | — | — | — | 860 |

The results in Table 1 illustrate that the resin compositions of the present invention, when allowed to cure at temperatures greater than or equal to 175, quickly yield compressive strengths suitable for use in subterranean applications.

Example 2

A modified API conductivity flow cell was used to perform proppant flowback testing to determine the effectiveness of the resin of the present invention in controlling proppant flowback. The conductivity flow cell was modified in that a 0.5-inch hole was installed a one end of the flow cell to simulate a perforation and a wire-mesh screen was initially inserted in the perforation to prevent production of the proppant. Ceramic proppant of 20/40-mesh was coated with 3% resin by weight of the proppant. The resin composition used was identical to that described in Example 1. The resin-coated proppant was then slurried into a viscous fracturing fluid as described in Example 1. The proppant slurry was packed into the modified conductivity cell to a loading of 2 lb/ft$^2$ and set at an initial closure stress of 2,000 psi and a temperature of 150° F. After 2 hours, the temperature of the cell was increased to 300° F. and after 6 hours the closure stress was increased to 6,000 psi. The cell was allowed to set at 300° F. and 6,000 psi for 12 additional hours after which a flowing dry gas was fed through the cell at 50 standard liters per minute and an internal pressure of 400 psi. Following the treatment with the dry gas, the internal pressure on the cell was released, the wire-mesh screen was removed from the perforation, and dry gas was again fed to the cell. The gas was allowed to exit through the perforation and proppant production was monitored. Even once the dry gas feed rate increased to 760 standard liters per minute (which is equivalent to a field, gas production flow rate of 155 MMSCFT per day), only a few grains of proppant exited the cell, illustrating that the resin compositions of the present invention are capable of consolidating particulates and controlling proppant flowback.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method comprising:
   providing a resin composition comprising:
   about 5% to about 30% phenol by weight of the resin composition;
   about 40% to about 70% phenol formaldehyde by weight of the resin composition;
   about 10% to about 40% furfuryl alcohol by weight of the resin composition;
   about 0.1% to about 3% of a silane coupling agent by weight of the resin composition; and
   about 1% to about 15% of a surfactant by weight of the resin composition;
   providing proppant particles; and
   coating the resin composition onto at least a portion of the proppant particles to create resin-coated proppant particles, wherein the resin composition does not substantially cure during coating.

2. The method of claim 1 wherein the silane coupling agent comprises at least one silane coupling agent selected from the group consisting of: N-2-(aminoethyl)-3-aminopropyltrimethoxysilane, 3-glycidoxypropyltrimethoxysilane, and n-beta-(aminoethyl)-gamma-aminopropyl trimethoxysilane.

3. The method of claim 1 wherein the surfactant comprises at least one surfactant selected from the group consisting of: ethoxylated nonyl phenol phosphate ester, a cationic surfactant, a non-ionic surfactant, and an alkyl phosphonate surfactant.

4. The method of claim 1 wherein the amount of the resin composition coated onto the portion of the proppant particles is about 0.1% to about 5% by weight of the portion of the proppant particles.

5. The method of claim 1 wherein the resin composition further comprises a solvent.

6. The method of claim 5 wherein the solvent comprises at least one solvent selected from the group consisting of: 2-butoxy ethanol, butylglycidyl ether, dipropylene glycol methyl ether, dipropylene glycol dimethyl ether, dimethyl sulfoxide, dimethyl formamide, diethyleneglycol methyl ether, diethylene glycol dimethyl ether, ethyleneglycol butyl ether, diethyleneglycol butyl ether, gamma-butyrolactone, butylene carbonate, propylene carbonate, ethylene carbonate, methanol, butyl alcohol, d-limonene, and a fatty acid methyl ester.

7. A method comprising:
   providing a resin composition comprising:
   about 5% to about 30% phenol by weight of the resin composition;
   about 40% to about 70% phenol formaldehyde by weight of the resin composition;
   about 10% to about 40% furfuryl alcohol by weight of the resin composition;
   about 0.1% to about 3% of a silane coupling agent by weight of the resin composition; and
   about 1% to about 15% of a surfactant by weight of the resin composition;
   providing proppant particles;
   coating the resin composition onto at least a portion of the proppant particles to create resin-coated proppant particles; and
   introducing the resin-coated proppant particles into a subterranean zone, wherein the resin composition does not substantially cure prior to introducing the resin-coated proppant particles into the subterranean zone.

8. The method of claim 7 wherein the silane coupling agent comprises at least one silane coupling agent selected from the group consisting of: N-2-(aminoethyl)-3-aminopropyltrimethoxysilane, 3-glycidoxypropyltrimethoxysilane, and n-beta-(aminoethyl)-gamma-aminopropyl trimethoxysilane.

9. The method of claim 7 wherein the surfactant comprises at least one surfactant selected from the group consisting of: ethoxylated nonyl phenol phosphate ester, a cationic surfactant, a non-ionic surfactant, and an alkyl phosphonate surfactant.

10. The method of claim 7 wherein the amount of the resin composition coated onto the portion of the proppant particles is about 0.1% to about 5% by weight of the portion of the proppant particles.

11. The method of claim 7 wherein the resin composition further comprises a solvent.

12. The method of claim 11 wherein the solvent comprises at least one solvent selected from the group consisting of: 2-butoxy ethanol, butylglycidyl ether, dipropylene glycol methyl ether, dipropylene glycol dimethyl ether, dimethyl sulfoxide, dimethyl formamide, diethyleneglycol methyl ether, diethylene glycol dimethyl ether, ethyleneglycol butyl ether, diethyleneglycol butyl ether, gamma-butyrolactone, butylene carbonate, propylene carbonate, ethylene carbonate, methanol, butyl alcohol, d-limonene, and a fatty acid methyl ester.

13. The method of claim 7 further comprising:
   providing a fracturing fluid;
   mixing the resin-coated proppant particles into the fracturing fluid; and
   introducing the fracturing fluid comprising the resin-coated proppant particles into the subterranean zone at a pressure sufficient to extend or create at least one fracture in the subterranean zone.

14. The method of claim 13 wherein the fracturing fluid comprises at least one fluid selected from the group consisting of: an aqueous gel and an emulsion.

15. The method of claim 13 wherein the fracturing fluid comprises at least one additive selected from the group consisting of: a breaker, a stabilizer, a fluid loss control additive, a clay stabilizer, and a bactericide.

16. The method of claim 13 wherein the fracturing fluid comprises at least one fluid selected from the group consisting of: fresh water, salt water, brine, and seawater.

17. The method of claim 13 wherein the fracturing fluid comprises an aqueous gel comprised of:
   water;

a gelling agent; and a cross-linking agent.

18. A method comprising:
providing a resin composition comprising:
about 5% to about 30% phenol by weight of the resin composition;
about 40% to about 70% phenol formaldehyde by weight of the resin composition;
about 10% to about 40% furfuryl alcohol by weight of the resin composition;
about 0.1% to about 3% of a silane coupling agent by weight of the resin composition; and
about 1% to about 15% of a surfactant by weight of the resin composition;
providing an initial portion of proppant particles, a middle portion of proppant particles, and a last portion of proppant particles;
coating the resin composition onto at least the initial portion of proppant particles and the last portion of proppant particles to create an initial portion of resin-coated proppant particles and a last portion of resin-coated proppant particles, wherein the resin composition does not substantially cure during coating;
introducing the initial portion of resin-coated proppant particles into a fracture in a subterranean zone;
introducing the middle portion of proppant particles into the fracture in the subterranean zone; and
introducing the last portion of resin-coated proppant particles into the fracture in the subterranean zone.

19. The method of claim 18 wherein the resin composition is not applied to the middle portion of proppant particles.

20. The method of claim 18 further comprising applying the resin composition intermittently to the middle portion of proppant particles.

* * * * *